United States Patent [19]

Miyai et al.

[11] Patent Number: 4,503,198

[45] Date of Patent: Mar. 5, 1985

[54] ELECTRON RADIATION CURABLE RESIN

[75] Inventors: Seiichi Miyai, Tagajyo; Kaoru Nakajima, Izumi; Masashi Somezawa, Sendai, all of Japan

[73] Assignee: Sony Corporation, Tokyo, Japan

[21] Appl. No.: 492,023

[22] PCT Filed: Aug. 19, 1982

[86] PCT No.: PCT/JP82/00324

§ 371 Date: Apr. 18, 1983

§ 102(e) Date: Apr. 18, 1983

[87] PCT Pub. No.: WO83/00696

PCT Pub. Date: Mar. 3, 1983

[30] Foreign Application Priority Data

Aug. 19, 1981 [JP] Japan .................................. 56-129741
Aug. 19, 1981 [JP] Japan .................................. 56-129742

[51] Int. Cl.³ .................. C08F 2/54; C08F 283/04; C08G 18/38; C08G 63/68
[52] U.S. Cl. ................ 525/440; 204/159.19; 523/181; 525/455; 525/920; 528/71
[58] Field of Search ............. 525/920, 455, 440; 204/159.19

[56] References Cited

U.S. PATENT DOCUMENTS

| | | | |
|---|---|---|---|
| 3,509,234 | 4/1970 | Burlant | 525/455 |
| 3,641,199 | 2/1972 | Niedenhausen | 525/920 |
| 3,677,920 | 7/1972 | Kai | 525/920 |
| 4,072,770 | 2/1978 | Ting | 525/920 |
| 4,112,017 | 9/1978 | Howard | 525/920 |
| 4,129,641 | 12/1978 | Ferrarini | 525/455 |

*Primary Examiner*—John C. Bleutge
*Assistant Examiner*—A. H. Koeckert
*Attorney, Agent, or Firm*—Hill, Van Santen, Steadman & Simpson

[57] ABSTRACT

The electron radiation curable resin of this invention is an oligopolyester-urethane resin having urethane bonds at both terminals of a polyester moiety, or a polyester-polyurethane resin wherein polyester moieties are chain-extended through urethane bonds. The resin has a molecular weight of about 1,000 to 50,000, and has a double bond at each terminal of the molecule and contains in the molecure about 0.2 to 30 mol % of carboxylic acid component having a metal sulfonate group based on the total carboxylic acid component.

This electron radiation curable resin is suitable as a binder for a magnetic paint for producing magnetic recording medium such as magnetic tape, and can provide a magnetic recording medium having excellent dispersibility, durability, and solvent resistance.

5 Claims, No Drawings

ELECTRON RADIATION CURABLE RESIN

TECHNICAL FIELD

The present invention relates to an electron radiation curable resin.

BACKGROUND ART

Heretofore, various resins have been synthesized which have double bonds in the molecule and can form crosslinking of network structure through the cleavage of the double bonds on exposure to electron radiation. On the other hand, it has been found that a polyester resin having hydrophilic sulfonate groups but having no double bonds in the molecule is good in ability to disperse magnetic particles when used as a binder for a magnetic coating material for producing magnetic recording medium such as magnetic tape, but is poor in solvent resistance and mechanical strength of the coating film when applied to magnetic tape. Moreover, it has been found that a polyester-polyurethane resin having metal sulfonate groups but having no double bonds in the molecule is also good in ability to disperse magnetic particles and abrasion resistance of coating film but is not satisfactory in solvent resistance.

DISCLOSURE OF THE INVENTION

It is an object of the present invention to provide an electron radiation curable resin which not only has good ability to disperse magnetic particles like the conventional polyester-polyurethane resin but also forms a coating film superior in solvent resistance, abrasion resistance, and mechanical strength, when it is used as a binder for a magnetic coating material for producing magnetic recording medium, particularly magnetic tape and the like.

The electron radiation curable resin of this invention is an oligopolyester-urethane resin having urethane bonds at both terminals of a polyester moiety, or a polyester-polyurethane resin wherein the polyester moieties are chain-extended through urethane bonds. This resin has a molecular weight of about 1,000 to 50,000, and has a double bond at each terminal of the molecule and contains in the molecule about 0.2 to 30 mol% of carboxylic acid component having a metal sulfonate group based on the total carboxylic acid component. The oligopolyester-urethane resin preferably has a molecular weight of about 1,000 to 10,000, and the polyester-polyurethane resin preferably has a molecular weight of about 10,000 to 50,000.

The carboxylic acid component in the polyester resin used in this invention may include, for example, an aromatic dicarboxylic acid such as terephthalic acid, isophthalic acid, orthophthalic acid, and 1,5-naphthalic acid; an aliphatic dicarboxylic acid such as succinic acid, adipic acid, azelaic acid, sebacic acid, or dodecanedicarboxylic acid; an aromatic hydroxycarboxylic acid such as p-hydroxybenzoic acid or p-(2-hydroxyethoxy)benzoic acid; a tricarboxylic acid such as trimellitic acid, trimesic acid, or a tetracarboxylic acid such as pyromellitic acid. Preferable examples among them are terephthalic acid, isophthalic acid, adipic acid, and sebacic acid.

The polyhydric alcohol which is other component of the polyester resin used in this invention may include, for example, an aliphatic diol such as ethylene glycol, propylene glycol, 1,3-propanediol, 1,4-butanediol, 1,5-pentanediol, neopentyl glycol, 1,6-hexanediol, 2,2,4-trimethyl-1,3-pentanediol, or an substituted derivative thereof; an alicyclic diol such as 1,4-cyclohexane dimethanol; a polyalkylene glycol such as diethylene glycol, dipropylene glycol, polyethylene glycol, polypropylene glycol, or polytetramethylene glycol; and an alkylene oxide adduct of an aromatic diol such as ethylene oxide adduct or propylene oxide adduct of bisphenol A, or ethylene oxide adduct or propylene oxide adduct of hydrogenated bisphenol A. The polyhydric alcohol may also include a triols or a tetraol such as trimethylol ethane, trimethylol propane, glycerin, or pentaerythritol. Each polyhydric alcohol is preferably used in combination with diols.

The dicarboxylic acid having a metal sulfonate group which is still other component of the copolyester resin used in this invention may include, for example, an aromatic dicarboxylic acid having an alkali metal sulfonate group such as 2-sodiumsulfoterephthalic acid, 2-potassiumsulfoterephthalic acid, 5-sodiumsulfoisophthalic acid, and 5-potassiumsulfoisophthalic acid. Any organic acid which is exemplified above as the carboxylic acid component and have a metal sulfonate group may be used. The metal sulfonate group may preferable be an alkali metal sulfonate group. The carboxylic acid containing a metal sulfonate group should preferably be contained in an amount of about 0.2 to 30 mol%, more preferably about 0.5 to 10 mol%, based on the total carboxylic acid component. If the content of the carboxylic acid having a metal sulfonate group is excessively low, the resulting electron radiation curabl resin is poor in ability to disperse a dispersoid. On the other hand, if the content of the carboxylic acid component is excessively high, the resulting electron radiation curable resin is poor in solubility in common solvents and does not provide a good coating material.

The oligopolyester-urethane resin in this invention can be prepared by bonding the hydroxyl groups at at least both terminals of the above-mentioned copolyester resin to isocyanate groups of a diisocyanate compound. Also, the polyester-polyurethane resin can be prepared by chain-extending the copolyester resin with an isocyanate compound. The isocyanate compound to be used for this purpose may include, for example, an aliphatic diisocyante such as tetramethylene diisocyante or hexamethylene diisocyanate; an aromatic diisocyanate such as m-phenylene diisocyanate, p-phenylene diisocyanate, 2,4-tolylene diisocyanate, 2,6-tolylene diisocyanate, m-xylylene diisocyanate, p-xylylene diisocyanate, diphenylmethane diisocyanate, 3,3'-dimethoxy-4,4'-biphenylene diisocyanate, 3,3'-dimethyl-4,4'-biphenylene diisocyanate, 4,4'-diisocyanate diphenylether, 1,5-naphthalene diisocynate, or 2,4-naphthalene diisocyanate; and an alicyclic diisocyanate, such as 1,3-diisocyanate methylcyclohexane, 1,4-diisocyanate methylcyclohexane, 4,4'-diisocyanate dicyclohexylmethane, or isophorone diisocyanate.

The compound which is used to introduce double bonds to at least both terminals of the above-mentioned oligopolyester-urethane or polyester-polyurethane may include an acrylic monomer or methacrylic monomer having a hydroxyl group and a double bond at each terminal of the molecule. Such a monomer is represented by the general formula:

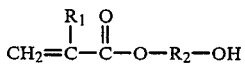

(where $R_1$ is a hydrogen atom or methyl group, and $R_2$ is a substituted or unsubstituted alkylene group.) The alkylene group in the formula is a linear or branched divalent saturated hydrocarbon residue of carbon number 1 to 12. The alkylene group may be substituted by a halogen atom, an alkyloxy group of carbon number 1 to 4 with or without 1 to 3 substituted halogen atoms, an alkenyloxy group of carbon number 2 to 4, or an alkenylcarbonyloxy group of carbon number 2 to 4.

Preferred examples of the compound represented by the above formula include 2-hydroxyethyl ester, 2-hydroxypropyl ester, 2-hydroxybutyl ester, 2-hydroxyoctyl ester, 2-hydroxydodecyl ester, 2-hydroxy-3-chloropropyl ester, 2-hydroxy-3-acryloxypropyl ester, 2-hydroxy-3-methacryloxypropyl ester, 2-hydroxy-3-acetoxypropyl ester, 2-hydroxy-3-chloroacetoxypropyl ester, 2-hydroxy-3-dichloroacetoxypropyl ester, 2-hydroxy-3-trichloroacetoxypropyl ester, 2-hydroxy-3-crotonyloxypropyl ester and 2-hydroxy-3-allyloxy ester of acrylic acid or methacrylic acid. In addition to the above preferred compounds, any other compounds can be used in this invention so long as they have an active hydrogen atom that reacts with the isocyanate group of the oligopolyester-urethane or polyester-polyurethane and has an acrylic or methacrylic double bond.

The electron radiation curable resin of this invention can be produced according to the conventional method. The oligopolyester-urethane resin can be produced as follows: At first, a copolyester resin having a proper molecular weight is produced in the usual way from the above-mentioned carboxylic acid, carboxylic acid containing a metal sulfonate group, and polyhydric alcohol. The resulting copolyester resin in then reacted with a diisocyanate compound so that the hydroxyl groups at at least both terminals of the copolyester resin bond to the isocyanate groups. The isocyanate groups at both terminals are further reacted with the above-mentioned acrylic or methacrylic monomer so as to introduce the acrylic or methacrylic double bonds to both the terminals. The polyester-polyurethane resin can be produced as follows: At first, a copolyester resin is produced in the same way as above. Then, the resulting copolyester resin is reacted with a diisocyanate compound so that chain of the copolyester resin is extended through the urethane bond until a proper molecular weight is reached. The resulting product is further reacted with the above-mentioned acrylic monomer or methacrylic monomer.

The electron radiation curable resin of this invention produced as above can be used as a binder for a magnetic paint for producing magnetic recording medium such as magnetic tape. On account of the extremely hydrophilic metal sulfonate group in the molecule, this resin has an outstanding ability to disperse magnetic particles such as $\gamma$-$Fe_2O_3$ having hydrophilic groups on their surface when used as a binder for them to form a magnetic layer on a nonmagnetic substrate. Thus, it follows that if the resin is used as a binder and cured by electron radiation, a magnetic layer having good surface properties can be produced, and hence a magnetic recording medium having good surface properties can be obtained. The resin of this invention has at both terminals the acrylic or methacrylic double bonds that open to form the crosslinking structure on exposure to electron radiation. Therefore, the intermolecular or intramolecular network crosslinking structure is formed by electron radiation. This results in a magnetic layer having high abrasion resistance and durability. Moreover, the resin of this invention has the double bonds at both terminals of the molecule that form the crosslinking structure on exposure to electron radiation, and therefore, the resulting coating film for magnetic recording medium is superior in mechanical strength and solvent resistance.

In case the electron radiation curable resin of this invention can be used as a binder for magnetic recording medium, other components may be those constituting conventional magnetic recording media. Magnetic powder as a magnetic recording medium may include, for example, oxide magnetic powder such as $\gamma$-$Fe_2O_3$ and iron oxide in the intermediate oxidation state of $\gamma$-$Fe_2O_3$ and $Fe_3O_4$, Co-containing $\gamma$-$Fe_2O_3$, Co-containing $Fe_3O_4$, Co-containing iron oxide in the intermediate oxidation state of $\gamma$-$Fe_2O_3$ and $Fe_3O_4$, the above-mentioned iron oxide containing further more than one metal element (particularly transition metal element), the above-mentioned iron oxide having a covering layer composed mainly of cobalt oxide or cobalt hydroxide, $CrO_2$, or $CrO_2$ with a $Cr_2O_3$ layer formed thereon by reducing the surface of $CrO_2$; or ferromagnetic fine powder of Fe metal, Co metal, Ni metal, Fe-Co alloy, Fe-Ni alloy, Fe-Co-Ni alloy, Co-Ni-P alloy, Co-Ni-Fe-B alloy, Fe-Ni-Zn alloy, Fe-Mn-Zn alloy, or Fe-Co-Ni-P alloy.

The magnetic paint composed of the electron radiation curable resin of this invention and magnetic powder may be incorporated with an abrasive such as aluminum oxide, chromium oxide, or silicon oxide; an antistatic agent such as carbon black; or a lubricant such as molybdenum sulfide, graphite, silicone oil, or olive oil. Moreover, the electron radiation curable resin of this invention may be used in combination with a conventional binder for magnetic recording media. Examples of such a binder may include vinyl chloride-vinyl acetate copolymer, vinyl chloride-vinyl acetate-vinyl alcohol copolymer, vinyl chloride-vinyl acetate-maleic acid copolymer, vinyl chloride-vinylidene chloride copolymer, vinyl chloride-acrylonitrile copolymer, acrylate ester-acrylonitrile copolymer, acrylate ester-vinylidene chloride copolymer, metacrylate ester-vinylidene chloride copolymer, metacrylate ester-styrene copolymer, thermoplastic polyurethane resin, phenoxy resin, polyvinyl fluoride, vinylidene chloride-acrylonitrile copolymer, butadiene-acrylonitrile copolymer, acrylonitrile-butadiene-acrylic acid copolymer, acrylonitrile-butadiene-methacrylic acid copolymer, polyvinylbutyral, cellulose derivative, styrenebutadiene copolymer, polyester resin, phenol resin, epoxy resin, thermosetting polyurethane resin, urea resin, melamine resin, alkyd resin, urea-formaldehyde resin, and mixtures thereof.

The solvent that can be used for preparing the magnetic coating material may include, for example, a ketone such as acetone, methyl ethyl ketone, methyl isobutyl ketone, or cyclohexanone; an alcohol such as methanol; an ester such as methyl acetate, ethyl acetate, butyl acetate, or ethyl butyrate; a glycol ether such as ethylene glycol dimethyl ether, ethylene glycol monoethyl ether, or dioxane; an aromatic hydrocarbon such as benzene, toluene, or xylene; or aliphatic hydrocarbon such as hexane, or heptane; or a mixture thereof.

The nonmagnetic substrate that can be used for producing magnetic recording medium may include, for example, a polyester such as polyethylene terephthalate; a polyolefin such as polypropylene; a cellulose derivative such as cellulose triacetate or cellulose diacetate; polycarbonate; polyvinyl chloride; polyimide; a metal such as aluminum or copper; or paper.

The magnetic paint composed as mentioned above is applied onto a nonmagnetic substrate in the usual way and then dried to form a coating film. The coating film should preferably be exposed to electron radiation after calendering; however, it is also possible to carry out calendering after irradiation. The irradiation can be accomplished with electron rays as well as neutron rays and gamma-rays. Electron rays are preferred from industrial point of view. The preferred dose is ca. 1 to 10 Mrad, more suitably ca. 2 to 7 Mrad. Where an electron accelerator is used for irradiation, the accelerating energy should be higher than about 100 keV.

BEST MODE FOR CARRYING OUT THE INVENTION

The invention is now described with reference to the following examples. In the Examples and Comparative Examples, quantities are expressed as parts by weight.

EXAMPLE 1

Oligopolyester-urethane resin having double bonds and metal sulfonate groups

Into a reaction vessel equipped with a thermometer, stirrer, and partial refluxing type condenser were charged 119.2 parts of dimethyl terephthalate, 89.4 parts of dimethyl isophthalate, 136.5 parts of 5-sodiumsulfoisophthalic acid, 148.2 parts of ethylene glycol, 203.4 parts of neopentyl glycol, and 0.025 part of zinc acetate and 0.003 part of sodium acetate, the last two components being catalysts. The ester exchange reaction was carried out at 180° C. to 220° C. for 3 hours. Then, 376.2 parts of sebacic acid was added, and the reaction was continued at 200° C. to 240° C. for 2 hours. The pressure of the reaction system was reduced to 10 mmHg over 30 minutes. While keeping the reaction system at 3 to 10 mmHg, the polycondensation reaction was carried out at 250° C. for 2 hours. The resulting copolyester resin was found to have a reduced viscosity $\eta_{sp}/c = 0.156$ (methyl ethyl ketone:toluene=1:1, 30° C.) and an OH group concentration of 42 mmol/g. The copolyester resin was analyzed by nuclear magnetic resonance to find the composition as follows:

Terephthalic acid: 20 mol%, isophthalic acid: 15 mol%, 5-sodiumsulfoisophthalic acid: 5 mol%, sebacic acid: 60 mol%, ethylene glycol: 50 mol%, and neopentyl glycol: 50 mol%.

Subsequently, into a reaction vessel equipped with a thermometer, stirrer, and reflux condenser were charged 50 parts of the copolyester resin prepared as above, 73 parts of methyl ethyl ketone, 73 parts of toluene, 12.7 parts of diphenylmethane diisocyanate, and 0.005 part of dibutyltin dilaurate. The reaction was carried out at 70° C. to 90° C. for 3 hours.

To the oligopolyester-urethane obtained as above was added 3.96 parts of β-hydroxyethyl methacrylate, and the reaction was carried out at 70° C. to 90° C. for 3 hours. There was obtained an oligopolyester-urethane resin having a reduced viscosity $\eta_{sp}/C = 0.163$ (methyl ethyl ketone:toluene=1:1, 30° C.).

COMPARATIVE EXAMPLE 1

Oligopolyester-urethane resin having double bonds but having no metal sulfonate groups Into a reaction vessel equipped with a thermometer, stirrer, and partial refluxing type condenser were charged 119.2 parts of dimethyl terephthalate, 119.2 parts of dimethyl isophthalate, 148.2 parts of ethylene glycol, 203.4 parts of neopentyl glycol, and 0.025 part of zinc acetate and 0.003 part of sodium acetate, the last two components being catalysts. The ester exchange reaction was carried out at 180° C. to 220° C. for 3 hours. Then, 376.2 parts of sebacic acid was added. Thus, there was obtained a copolyester resin in the same way as in Example 1. The resulting copolyester resin was found to have an OH group concentration of 41 mmol/g. The ratio of the carboxylic acid components in the copolyester resin was 20 mol% of dimethyl terephthalate, 20 mol% of dimethyl isophthalate, and 60 mol% of sebacic acid, and the ratio of the glycol components was 50 mol% each of ethylene glycol and neopentyl glycol.

Then, the copolyester resin was reacted with diphenylmethane diisocyanate as in Example 1, and subsequently with β-hydroxyethyl methacrylate. Thus, there was obtained an oligopolyester-urethane resin having double bonds. The concentration of OH groups in this resin was 37 mmol/g.

COMPARATIVE EXAMPLE 2

Oligopolyester-urethane resin having no double bonds but having metal sulfonate groups The same copolyester resin was obtained in Example 1 was used, except that the reaction for introducing double bonds was not carried out. $\eta_{sp}/c = 0.156$ (methyl ethyl ketone:toluene=1:1, 30° C.). The resulting resin was found to have an OH group concentration of 42 mmol/g. The ratio of the carboxylic acid components in the resin was 20 mol% of dimethyl terephthalate, 15 mol% of dimethyl isophthalate, 5 mol% of 5-sodiumsulfoisophthalic acid, and 60 mol% of sebacic acid, and the ratio of the glycol components was 50 mol% each of ethylene glycol and neopentyl glycol.

COMPARATIVE EXAMPLE 3

Oligopolyester-urethane resin having neither double bonds nor metal sulfonate groups The same copolyester resin as obtained in Comparative Example 1 was used, except that the reaction for introducing double bonds was not carried out. The ratio of the carboxylic acid components in the resin was 20 mol% of dimethyl terephthalate, 20 mol% of dimethyl isophthalate, and 60 mol% of sebacic acid, and the ratio of the glycol components was 50 mol% each of ethylene glycol and neopentyl glycol.

EXAMPLE 2

Polyester-polyurethane resin having double bonds and metal sulfonate groups

Into a reaction vessel equipped with a thermometer, stirrer, and partial refluxing type condenser were charged 119.2 parts of dimethyl terephthalate, 89.4 parts of dimethyl isophthalate, 136.5 parts of dimethyl 5-sodiumsulfoisophthalate, 148.2 parts of ethylene glycol, 203.4 parts of neopentyl glycol, and 0.025 part of zinc acetate and 0.003 part of sodium acetate, the last two components being catalysts. The ester exchange reaction was carried out at 180° C. to 220° C. for 3 hours. Then, 376.2 parts of sebacic acid was added, and the reaction was continued at 200° C. to 240° C. for 2 hours. The pressure of the reaction system was reduced to 10 mmHg over 30 minutes. While keeping the reaction system at 3 to 10 mmHg, the polycondensation reaction was carried out at 250° C. for 2 hours. The resulting copolyester resin was found to have a reduced viscosity $\eta_{sp}/c=0.156$ (methyl ethyl ketone:toluene=1:1, 30° C.) and an OH group concentration of 42 mmol/g. The copolyester resin was analyzed by nuclear magnetic resonance to find the composition as follows:

Terephthalic acid: 20 mol%, isophthalic acid: 15 mol%, 5-sodiumsulfoisophthalic acid: 5 mol%, sebacic acid: 60 mol%, ethylene glycol: 50 mol%, and neopentyl glycol: 50 mol%.

Subsequently, into a reaction vessel equipped with a thermometer, stirrer, and reflux condenser were charged 50 parts of the copolyester resin prepared as above, 73 parts of methyl ethyl ketone, 73 parts of toluene, 7.0 parts of diphenylmethane diisocyanate, and 0.0005 part of dibutyltin dilaurate. The reaction was carried out at 70° C. to 90° C. for 3 hours.

The resulting polyester-polyurethane having isocyanate groups at both terminals was found to contain 3.90 mmol/g of isocyanate groups and to have a reduced viscosity $\eta_{sp}/c=0.193$.

To the polyester-polyurethane resin obtained as above was added 9.54 parts of $\beta$-hydroxyethyl methacrylate, and the reaction was carried out for 3 hours. Thus, there was obtained a polyester-polyurethane resin having a reduced viscosity $\eta_{sp}/c=0.210$ (methyl ethyl ketone:toluene=1:1, 30° C.).

COMPARATIVE EXAMPLE 4

Polyester-polyurethane resin having double bonds but having no metal sulfonate groups Into a reaction vessel equipped with a thermometer, stirrer, and partial refluxing type condenser were charged 119.2 parts of dimethyl terephthalate, 119.2 parts of dimethyl isophthalate, 148.2 parts of ethylene glycol, 203.4 parts of neopentyl glycol, and 0.025 part of zinc acetate and 0.003 part of sodium acetate, the last two components being catalysts. The ester exchange reaction was carried out at 180° C. to 220° C. for 3 hours. Then, 376.2 parts of sebacic acid was added. Thus, there was obtained a copolyester resin in the same way as in Example 2. The resulting copolyester resin was found to have an OH group concentration of 41 mmol/g. The ratio of the carboxylic acid components in the copolyester resin was 20 mol% of dimethyl terephthalate, 20 mol% of dimethyl isophthalate, and 60 mol% of sebacic acid, and the ratio of the glycol components was 50 mol% each of ethylene glycol and neopentyl glycol.

Then, the copolyester resin was reacted with diphenylmethane diisocyanate as in Example 2, and subsequently with $\beta$-hydroxyethyl methacrylate. Thus, there was obtained a polyester-polyurethane resin having double bonds. $\eta_{sp}/c=0.173$ (methyl ethyl ketone=1:1, 30° C.)

The properties of the resin obtained in the above-mentioned Examples and Comparative Examples were measured as follows:

1. Dispersibility

In order to evaluate the resins obtained in Examples and Comparative Examples in terms of their ability to disperse magnetic particles, a settling test was carried out using $\gamma$-Fe$_2$O$_3$ as a dispersoid.

In a 50-ml graduated cylinder with a ground glass stopper were placed 1.0 g of $\gamma$-Fe$_2$O$_3$, 0.25 g of the resin, and 50.0 ml of mixed solvent (methyl isobutyl ketone:toluene:cyclohexane=2:2:1 by weight). The resulting solution was shaked 100 times and then allowed to stand for 24 hours. The solution was shaked again 100 times and then allowed to stand to observe the settling behavior. The volume of settlings at equilibrium was measured in terms of vol%. The settling rate and the state of settlings were also observed. The results are shown in Table 1.

TABLE 1

| | Settling Test | | |
|---|---|---|---|
| Samples | Volume of settlings (%) | Settling rate (in relative values) | State of settlings |
| Example 1 | 5.6 | Slow | Dense |
| Comp. Example 1 | 12.0 | Fast | Loose |
| Comp. Example 2 | 6.5 | Slow | Dense |
| Comp. Example 3 | 14.0 | Fast | Loose |
| Example 2 | 6.3 | Slow | Dense |
| Comp. Example 4 | 13.2 | Fast | Loose |

2. Tensile properties

Each resin obtained in Examples 1 and 2 and Comparative Examples 1 and 4 was dried at 90° C. under 25 mmHg for 3 days to prepare a film of about 100-micron thickness. The film was cured by 5 Mrad of electron radiation at an accelerating voltage of 200 keV. Test specimens measuring 10 cm long and 0.625 cm wide were cut out from the cured film. The tensile properties of the test specimens were measured using a universal tensile machine. The resin obtained in Comparative Example 2 was tested in the same way, except that the electron radiation was not carried out. The results are shown in Table 2.

TABLE 2

| | 100% modulus (kg/cm$^2$) | Tensile strength at break T$_B$ (kg/cm$^2$) | Young's modulus E$_i$ (kg/cm$^2$) |
|---|---|---|---|
| Example 1 | 256 | 220 | 2.15 × 10$^4$ |
| Comp. Example 1 | 241 | 210 | 2.10 × 10$^4$ |
| Comp. Example 2 | 37 | 156 | 1.74 × 10$^4$ |
| Example 2 | 284 | 246 | 3.10 × 10$^4$ |
| Comp. Example 4 | 263 | 243 | 2.97 × 10$^4$ |

3. Solvent resistance

Each resin obtained in Example 2 and Comparative Examples 2, 3, and 4 was vacuum-dried at 60° C. to prepare a film. The film was cut into 1-cm square. The cut pieces were dipped in methyl ethyl ketone, toluene, and cyclohexane to observe if they dissolve. The films of the resins obtained in Example 2 and Comparative Example 4 were cured by electron radiation of 200 keV, and the films of the resins obtained in Comparative Examples 2 and 3 were not cured by electron radiation. The results are shown in Table 3.

TABLE 3

| | Methyl ethyl ketone | Toluene | Cyclohexane |
|---|---|---|---|
| Example 2 | Insoluble | Insoluble | Insoluble |
| Comp. Example 2 | Soluble | Soluble | Soluble |

TABLE 3-continued

|  | Methyl ethyl ketone | Toluene | Cyclo-hexane |
|---|---|---|---|
| Comp. Example 3 | Soluble | Soluble | Soluble |
| Comp. Example 4 | Insoluble | Insoluble | Insoluble |

Table 1 indicates that when it comes to the ability to disperse a dispersoid, there was no difference among the resins obtained in Examples 1 and 2 and Comparative Example 2, which all contained the metal sulfonate group, regardless of the presence or absence of double bonds, and that they were apparently superior to the resins obtained in Comparative Examples 1, 3, and 4, which all did not contain the metal sulfonate group.

Table 2 indicates that when it comes to the tensile properties, there was no difference among the resins obtained in Examples and Comparative Examples regardless of the presence or absence of the metal sulfonate group, so long as they were cured by electron radiation, and that they were greatly improved in tensile properties as compared with the resin of Comparative Example 2 which was not cured by electron radiation.

Table 3 indicates that the resins obtained in Example 2 and Comparative Example 4, which were cured by electron radiation, were insoluble in common solvents, whereas the uncured resins in Comparative Examples 2 and 3 were soluble in common solvents.

The resins obtained in the above-mentioned Examples and Comparative Examples were made into magnetic tape as follows:

Ten parts of $\gamma$-Fe$_2$O$_3$ magnetic particles, 5 parts of methyl ethyl ketone, and 7.5 parts of toluene were mixed by ball milling for 3 hours. The resulting mixture was further mixed with 2.5 parts of the resin obtained in Example 1, 5 parts of methyl ethyl ketone, and 7.5 parts of toluene by ball milling for 24 hours. After degassing, the resulting mixture was applied coating to a 16-micron thick polyethylene terephthalate film using a doctor blade with a 25-micron gap. The coated film was allowed to stand for about 1 hour in a parallel magnetic field of 900 Oe. Then, the coated film was dried in a hot-air drier at 90° C. for about 30 minutes. After removal of solvent, the magnetizable layer was 8.0 micron thick. The $R_s$ ($B_r/B_m$) was 0.87.

Each resin obtained in Example 2 and Comparative Examples 1, 2, 3, and 4 was made into a magnetizable layer on polyethylene terephthalate film in the same way as above.

The tapes made from the resins prepared in Examples 1 and 2 and Comparative Examples 1 and 4, which all have double bonds reactive to electron radiation, were cured by exposure to 5 Mrad of electron radiation at an accelerating voltage of 200 keV. The properties of the resulting magnetic tapes were investigated as follows:

1. Tensile properties:

Test specimens, 10 cm long and 0.625 cm wide, were cut out from the cured magnetic tapes made from the resins prepared in Examples 1 and 2 and Comparative Examples 1 and 4. The tensile properties of the test specimens were measured using a universal tensile machine.

2. Solvent resistance:

The magnetic layer was rubbed with a piece of gauze moistened with methyl ethyl ketone, until the layer disappeared. Solvent resistance is expressed in terms of the cycles of rubbing.

3. Powder dropping:

The tape was actually run on a tape recording machine, and the quantity of dropped powder accumulating on the pinch roller, capstan, guide, and head was observed. The results were rated by the demerit mark system (point 0 to point $-5$).

The results are shown in Table 4.

TABLE 4

| Sample | Properties of Magnetic Tape using each resin of Examples and Comp. Examples | | | |
|---|---|---|---|---|
|  | $R_s$ ($B_r/B_m$) | $E_i$ kg/cm$^2$ | Solvent resistance | Powder dropping |
| Example 1 | 0.87 | 9.26 × 10$^4$ | >100 | −0.5 |
| Comp. Example 1 | 0.63 | 9.03 × 10$^4$ | >100 | −1.5 |
| Comp. Example 2 | 0.87 | 5.44 × 10$^4$ | — | −1.0 |
| Comp. Example 3 | 0.63 | 4.20 × 10$^4$ | — | −3.0 |
| Example 2 | 0.87 | 9.30 × 10$^4$ | >100 | −0.5 |
| Comp. Example 4 | 0.63 | 8.71 × 10$^4$ | >100 | −1.5 |

It is noted from the above-mentioned results that the resins of Examples 1 and 2, which contained the metal sulfonate groups and were cured by electron radiation, were far superior in $R_s$, Young's modulus $E_i$, solvent resistance, and powder dropping to that of Comparative Example 3. Moreover, the resins of Examples 1 and 2 were not so different in $R_s$, ability to disperse a dispersoid, and ability to orient magnetic particles, from those in Comparative Examples 1 and 4; however, there was a considerable difference between them in powder dropping.

On the other hand, it is noted that the resin in Comparative Example 2 was far inferior in durability to the resins of Examples 1 and 2 which were cured by electron radiation. This also applies to the resins in Comparative Examples 1, 3, and 4.

APPLICATION OF THE INVENTION TO INDUSTRY

The foregoing indicates that the oligopolyester-urethane resin or polyester-polyurethane resin of this invention which contains metal sulfonate groups and is curable with electron radiation is superior in the ability to disperse a dispersoid, tensile properties, and solvent resistance to a polyester resin which does not contain metal sulfonate groups and does not undergo crosslinking by electron radiation. When the resin of this invention is used as a binder for magnetic tape, the resulting magnetic tape is apparently superior particularly in solvent resistance and durability. Thus, the electron radiation curable resin of this invention can be applied to magnetic recording media. In addition, it can be used in many areas as a binder for the coating film that requires solvent resistance and mechanical strength.

We claim:

1. An electron radiation curable resin comprising an oligopolyester-urethane resin having urethane bonds at both terminals of its polyester moiety, or a polyester-polyurethane resin wherein its polyester moieties are chain-extended through urethane bonds, said resin having a molecular weight of about 1,000 to 50,000, having an acrylate or methacrylate group at each terminal of the molecule, and containing in the molecule about 0.2 to 30 mol% of carboxylic acid component having a metal sulfonate group based on the total carboxylic acid component, said metal sulfonate group being pendent from the polymer chain and constituting a portion of an aromatic or aliphatic dicarboxylic acid.

2. The electron radiation curable resin as claimed in claim 1, wherein the molecular weight of the oligopolyester-urethane resin is about 1,000 to 10,000.

3. The electron radiation curable resin as claimed in claim 1, wherein the molecular weight of the polyester-polyurethane resin is about 10,000 to 50,000.

4. The electron radiation curable resin as claimed in claim 1, wherein the metal sulfonate group is an alkali metal sulfonate group.

5. The electron radiation curable resin as claimed in claim 1 wherein the compound for introducing the double bonds to both terminals of the molecule is an acrylic monomer or methacrylic monomer having a hydroxyl group and a double bond at each terminal of the molecule, as represented by the following general formula:

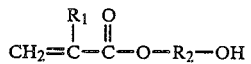

where $R_1$ is a hydrogen atom or methyl group, and $R_2$ is a substituted or unsubstituted alkylene group.

* * * * *